Oct. 18, 1932.                    C. E. BRE MILLER                    1,883,523
                    MACHINE FOR HEAT TREATING GLASS TUBES AND THE LIKE
                        Filed Sept. 16, 1927         2 Sheets-Sheet 1
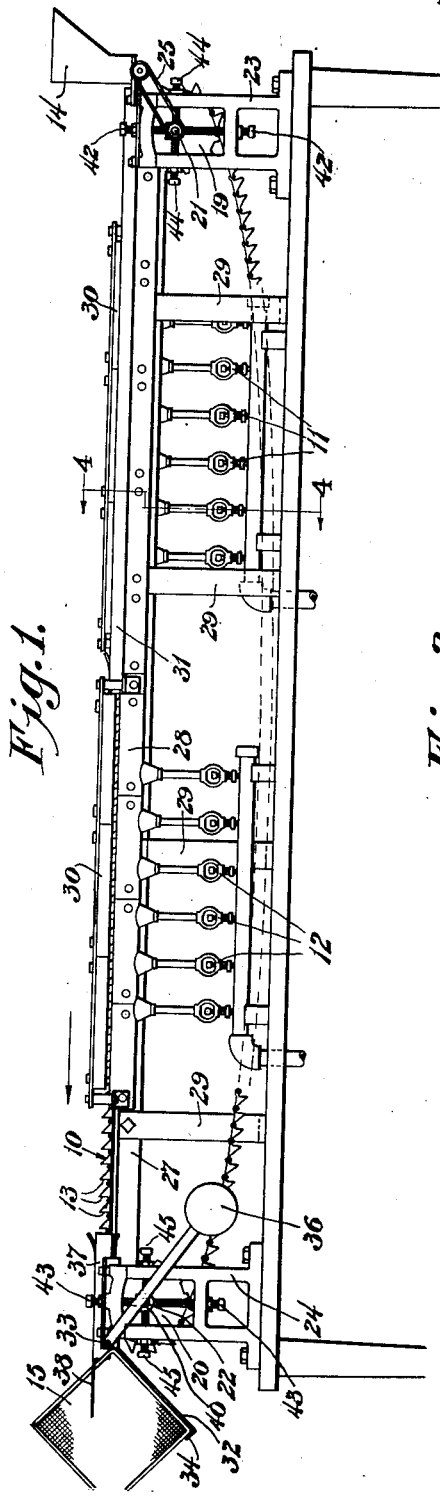
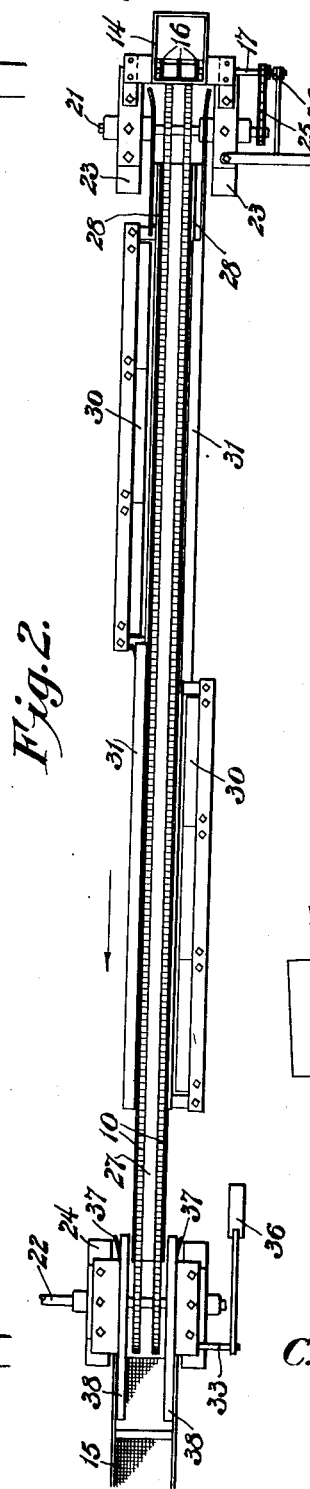
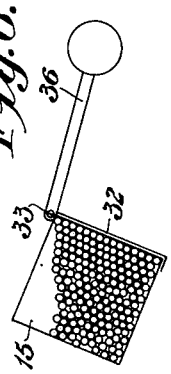
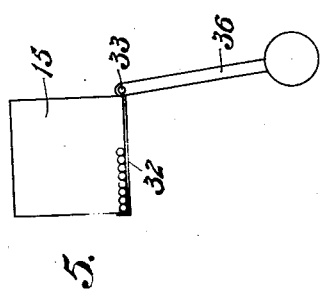
INVENTOR
C.E. BreMiller
BY
Philip E. Liggers
ATTORNEY Oct. 18, 1932.  C. E. BRE MILLER  1,883,523
MACHINE FOR HEAT TREATING GLASS TUBES AND THE LIKE
Filed Sept. 16, 1927  2 Sheets-Sheet 2
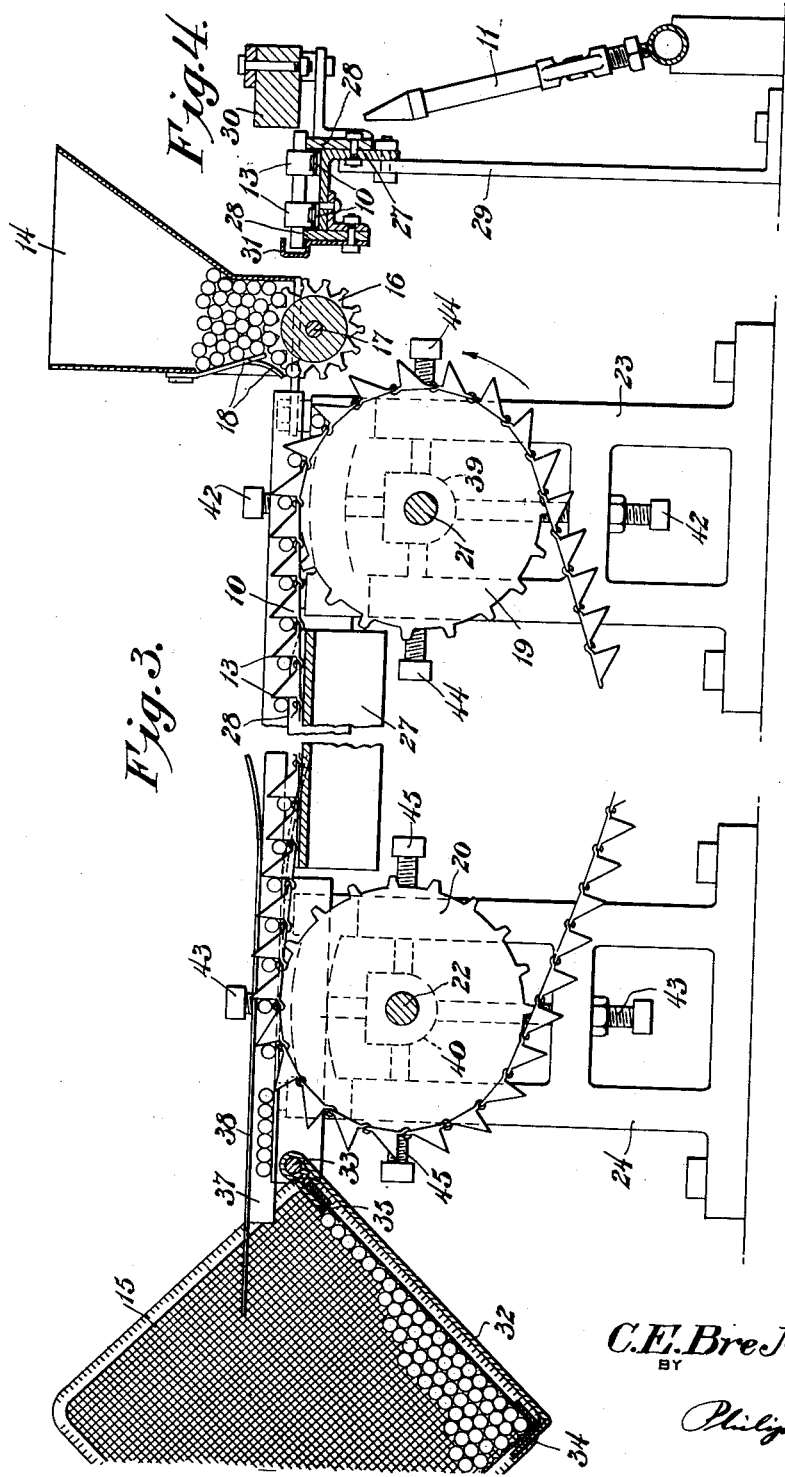
INVENTOR
C.E.BreMiller
BY
Philip E. Liggis,
ATTORNEY Patented Oct. 18, 1932

1,883,523

UNITED STATES PATENT OFFICE

CLIFFORD E. BRE MILLER, OF CHICAGO, ILLINOIS, ASSIGNOR TO COOK LABORATORIES, INC., OF CHICAGO, ILLINOIS, A CORPORATION OF DELAWARE

MACHINE FOR HEAT TREATING GLASS TUBES AND THE LIKE

Application filed September 16, 1927. Serial No. 219,888.

This invention relates to machines for heat treating glass tubes and the like; and aims among other objects to provide a machine of this type which will remove or smooth the rough edges of such tubes.

In the drawings, wherein for the purpose of illustration is shown the preferred embodiment of the invention;

Fig. 1 is a side elevation of a machine embodying the invention;

Fig. 2 is a top plan view of the same;

Fig. 3 is a vertical longitudinal sectional view on a larger scale;

Fig. 4 is a vertical sectional view on the scale of Fig. 3, taken on the line 4—4 of Fig. 1; and Figs. 5 and 6 are diagrammatic sketches showing how the receptacle moves automatically responsive to the numbers of tubes delivered to it.

In the manufacture of certain medicament-dispensing cartridges for hypodermic and other syringes, glass tubes are used which are cut from lengths of tubing. After such cutting the edges of the tubes are uneven, which may result in painful cuts to the users thereof, and which may cause the tubes to crack when subjected to later steps in the manufacturing process, or when used in the syringes. The present machine heats the ends of the tubes sufficiently so that the sharp edges are fused, leaving the ends of the tubes relatively smooth; and at the same time, the tube ends are materially stronger and more resistant to fracture.

Referring particularly to the drawings, there is shown a conveyor 10 to carry the tubes to be heat-treated past a source of heat, for example, Bunsen burners, preferably arranged in two batteries 11, 12 on opposite sides of the conveyor. Herein the conveyor is horizontal and comprises a pair of power driven endless chains, each of whose links has a projection 13 for engaging a tube, the two chains being spaced closer together than the length of one of the tubes, and being driven synchronously so that each of the tubes may be engaged by two opposite projections 13, which carry the tubes in the direction in which the conveyor moves. As shown, the conveyor moves between a supply station, herein the hopper 14, and a discharge station, herein the receptacle 15.

To deliver the tubes from the hopper 14 to the conveyor, notched wheels 16 (Fig. 3) are mounted on a power-driven shaft 17 in the bottom of the hopper 14; and the hopper has fingers or guards 18 cooperating with the wheels to insure the delivery of only one tube at a time. The linear velocity of the wheels 16 is preferably equal to the linear velocity of the chains so that the tubes are automatically deposited, one to each pair of projections 13 on the opposite sides of the conveyor.

The chains are shown trained over sprocket wheels 19 and 20 secured to shafts 21 and 22 respectively, mounted in suitable standards 23 and 24 respectively; and are driven by any source of motive power connected to either shaft 21, 22. Herein the hopper 14 is mounted on the standard 23 and the shaft 17 is driven at the required speed by a chain 25 or the like connected to the shaft 21. Suitable clutching means 26 may be connected to the shaft 17 if desired.

To guide the upper flights of the conveyor and maintain them properly spaced, a runway is provided in the form of an L or channel bar 27 having side flanges 28 and suitably supported on legs 29. The flanges 28, which are preferably of refractory material, such as fire-brick or the like to intensify and localize the heat of the burners, project above the bar 27 to protect the chains from the flames of the burners and to serve as tracks for the tubes, the ends of which project slightly over the flanges and into the flames of the burners. As the tubes do not rest on the chains but are merely rolled along the tracks by the projection on the chain, the entire circumference of the ends of the tubes is evenly heated.

It is preferable to locate the burners 11 on one side of the trackway near the hopper end of the conveyor and the burners 12 on the opposite side near the receptacle end. If the burners were placed directly opposite each other, both ends of the tube would be heated at the same time which may result in such heating throughout the length of the tubes that they would soften and droop in the middle, thus ruining them for use as the bodies of dispensing cartridges. By placing the batteries of burners some distance apart, the ends are alternately heated and cooled and the middles of the tubes are never heated to the point of softening. As the tubes are constantly moving, to provide a high capacity for the machine, each battery comprises a sufficient number of burners, or a sufficient heating zone, to insure heating all the tubes to the temperature necessary to soften the ends.

To keep the tubes in proper position in transit, guides 30 and 31 are provided on each side of the tracks. Those on the burner sides, indicated at 30, are supported slightly above and to the side of the track 28 to permit the flames to play on the ends of the tubes and are preferably of refractory material to withstand the heat. The guides 31 on the opposite side from the burners may be made of sheet metal or the like. To localize the heat so far as possible, all the burners are inclined (Fig. 4) to direct their flames against the tube ends and the refractory material, and preferably as shown are individually adjustable to compensate for irregularities in the flames and to adjust the flames relative to the articles to be heated.

The receptacle 15 into which the tubes are delivered after they have been treated is herein shown as being mounted on a swinging support 32 secured to a shaft 33 which is pivoted on the standard 24. The outer end of the support 32 is provided with an upturned flange 34 to support the rear of the receptacle and the inner end is provided with a flange 35 projecting into the receptacle and engaging the bottom thereof. The shaft preferably has a weighted arm 36 mounted thereon to counterbalance and keep the receptacle in the proper position. Obviously, the more treated tubes enter the receptacle, the greater its weight and the lower it will hang; thus the receptacle automatically makes room for the tubes as fast as necessary, and is always at the proper angle to insure easy entry of the tubes without a precipitate fall. The receptacle 15 is claimed per se in a co-pending application Ser. No. 264,681.

To direct the tubes into the receptacle, guides 37 in the form of strips of sheet metal or the like are employed on each side of the conveyor 10, which strips extend beyond the standards 24 and into the receptacle. Upper flanges 38 are formed on the guides 37 and extend into the receptacle beyond the guides to prevent the tubes from piling up and falling over the sides of the receptacle.

It is desirable to adjust the chains, preferably at either end, to raise or lower, tighten or loosen them, to effect the proper coordination with the tube feeding mechanism, the tube guides and the supports on which the tubes roll. As shown in Fig. 3, the shafts 21, 22 are supported in movable bearings 39, 40, respectively, which are adjustable vertically by the set screws 42, 43 respectively, and which are horizontally adjusted by set screws 44, 45 respectively.

In the operation of the machine, the hopper 14 is filled with tubes to be treated, which are delivered one at a time onto the conveyor 10 by which they are pushed along the tracks 28 through the flames of the burners 11 and 12 and into the receptacle 15 ready for use. The operator has merely to keep the hopper 14 filled with tubes to be treated, and to replace the filled receptacles with empty ones. As shown in Figs. 5 and 6, the treated tubes roll into the receptacle, gradually increasing its weight and causing it to lower automatically to receive additional tubes. The receptacles are composed chiefly of netting or other open material, giving free access to the air, and insuring cooling of the tubes before the next manufacturing process.

From the foregoing, it will be apparent that a machine has been provided which will efficiently and automatically remove the rough edges from the ends of glass tubes or the like, and will strengthen them. Moreover, the machine is simple in construction and may be manufactured and operated at very little expense.

Obviously the present invention is not restricted to the particular embodiment thereof herein shown and described. Moreover, it is not indispensable that all the features of the invention be used conjointly, since they may be employed advantageously in various combinations and subcombinations.

What is claimed is:—

1. A machine for treating glass cartridge tubes and the like, comprising, in combination, a conveyor; and a counterbalanced tube receiving receptacle at the discharge end of the conveyor; said receptacle being movable responsive to the increase in total weight of the tubes as they collect in the receptacle, so as to permit the entry of additional tubes.

2. A machine for treating the ends of glass cartridge tubes and the like, comprising, in combination, a storage hopper; a counterbalanced receiving receptacle; a conveyor between the hopper and the receptacle; a source of heat located on opposite sides of the conveyor; means for guiding the tubes in transit; the conveyor being so constructed and arranged that it feeds the tubes into the receptacle, which is at the discharge end of the conveyor; the counterbalancing of the receptacle permitting automatic changing of the position of the receptacle, as it fills, to receive additional tubes.

3. A machine for heat-treating the ends of glass tubes and the like; comprising, in combination, a hopper; a pivoted support; a counterbalance for said support; a tube receiving receptacle on the support; a conveyor for moving the tubes from the hopper to the receptacle and so constructed and arranged as to discharge the tubes into the receptacle; means for delivering the tubes from the hopper to the conveyor; and means for heat-treating the tubes in transit.

4. In combination, a conveyor for glass tubes and the like; a receptacle pivotally mounted at the discharge end of the conveyor adapted to receive the tubes from the conveyor; and a pair of tube guides extending longitudinally of the conveyor into the receptacle, said guides having upper flanges extending into the receptacle, beyond the ends of the guides, to prevent the tubes from piling up and falling out of the receptacle.

5. In combination, a conveyor for glass tubes and the like; a swinging support pivotally mounted at the discharge end of the conveyor; a receptacle carried by said swinging support; and a counterweight secured to the swinging support to counterbalance the weight of said support and said receptacle, as and for the purpose described.

6. A machine of the class described comprising, in combination, an endless conveyor having means for pushing the tubes; tube guiding and supporting means at the discharge end of the conveyor; a receptacle pivotally mounted at the discharge end of the receptacle and being counterbalanced to swing responsive to the greater weight of tubes as they accumulate in the receptacle; and means projecting from the tube guiding means into the receptacle to prevent the tubes from piling up and falling over the sides of the receptacle.

In testimony that I claim the foregoing as my own, I have hereto affixed my signature.

CLIFFORD E. BRE MILLER.